(12) United States Patent
David et al.

(10) Patent No.: US 8,488,812 B2
(45) Date of Patent: Jul. 16, 2013

(54) BIASING CIRCUIT FOR A MICROELECTROMECHANICAL ACOUSTIC TRANSDUCER AND RELATED BIASING METHOD

(75) Inventors: Filippo David, Milan (IT); Alessandro Gasparini, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 537 days.

(21) Appl. No.: 12/750,515

(22) Filed: Mar. 30, 2010

(65) Prior Publication Data
US 2010/0246859 A1 Sep. 30, 2010

(30) Foreign Application Priority Data

Mar. 31, 2009 (IT) .............. TO2009A0243

(51) Int. Cl.
*H04R 3/00* (2006.01)
(52) U.S. Cl.
USPC .......................... 381/111; 381/113
(58) Field of Classification Search
USPC .................... 381/111, 113, 150, 174, 191
See application file for complete search history.

(56) References Cited

U.S. PATENT DOCUMENTS

| 8,005,242 B2* | 8/2011 | Hsu et al. ................. 381/111 |
| 8,134,375 B2* | 3/2012 | Boom ........................ 324/679 |
| 2006/0147061 A1* | 7/2006 | Niwa et al. ................ 381/113 |
| 2008/0219474 A1* | 9/2008 | Deruginsky et al. ....... 381/111 |
| 2009/0003629 A1* | 1/2009 | Shajaan et al. ............. 381/113 |

FOREIGN PATENT DOCUMENTS

| JP | 2008-153981 A | 7/2008 |
| JP | 2008153981 A * | 7/2008 |
| WO | 2007/132422 A1 | 11/2007 |

OTHER PUBLICATIONS

Jawed, S.A. et al., "A Low-Power Interface for the Readout and Motion-Control of a MEMS Capacitive Sensor," 10th IEEE International Workshop on Advanced Motion Control, Apr. 26, 2008, pp. 122-125.

* cited by examiner

*Primary Examiner* — Mohammad Islam
*Assistant Examiner* — David Ton
(74) *Attorney, Agent, or Firm* — Seed IP Law Group PLLC

(57) ABSTRACT

A biasing circuit for an acoustic transducer is provided with: a voltage-booster stage, which supplies, on a biasing terminal, a boosted voltage for biasing a first terminal of the acoustic transducer; and filtering elements, set between the biasing terminal and the acoustic transducer, for filtering disturbances on the boosted voltage. The biasing circuit is further provided with switches, which can be actuated so as to connect the first terminal to the biasing terminal of the voltage-booster stage, directly during a start-up step of the biasing circuit, and through the filtering elements at the end of the start-up step.

38 Claims, 6 Drawing Sheets

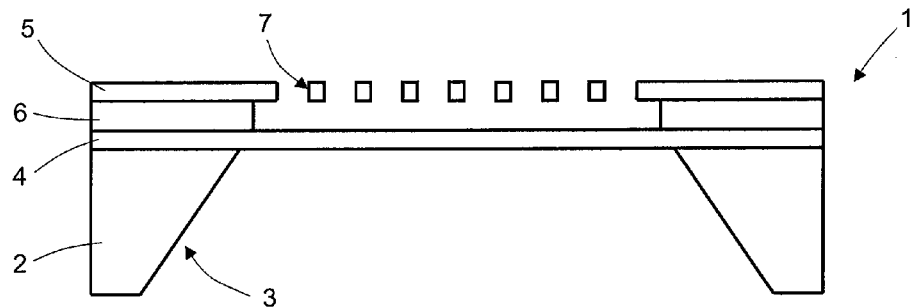
Fig.1 *(Prior Art)*
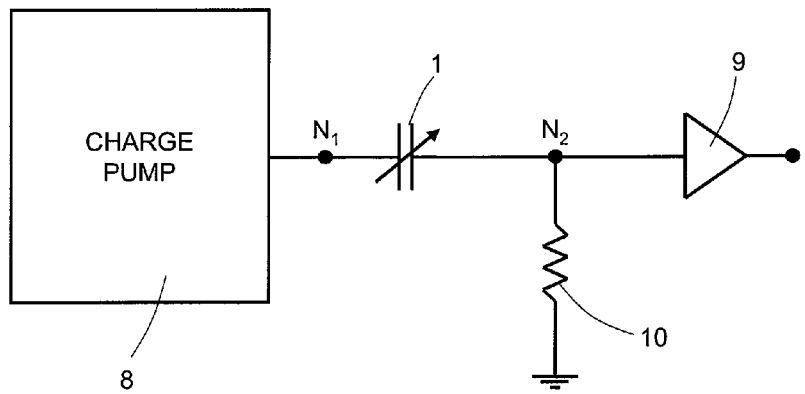
Fig.2 *(Prior Art)*
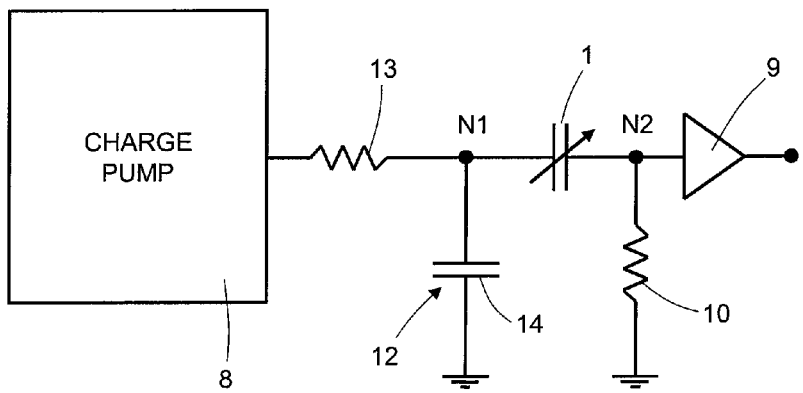
Fig.3 *(Prior Art)*

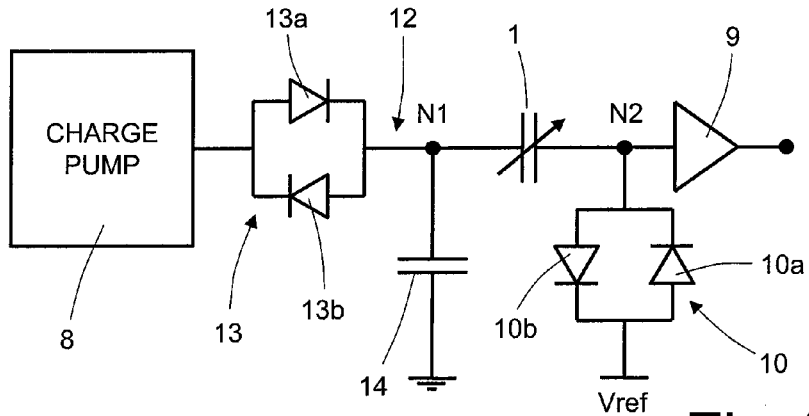
Fig.4 *(Prior Art)*
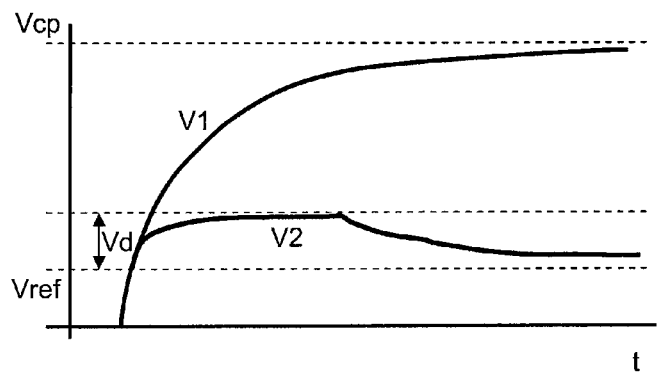
Fig.5 *(Prior Art)*
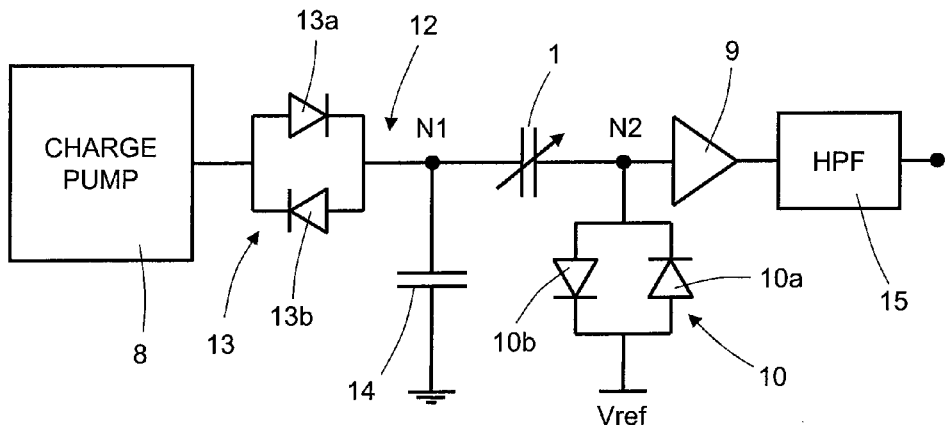
Fig.6 *(Prior Art)*

BIASING CIRCUIT FOR A MICROELECTROMECHANICAL ACOUSTIC TRANSDUCER AND RELATED BIASING METHOD

BACKGROUND

1. Technical Field

The present disclosure relates to a biasing circuit for an acoustic transducer, in particular a capacitive microphone of a MEMS (Microelectro-Mechanical System) type, to which the ensuing treatment will make explicit reference, without this implying any loss of generality. The present disclosure further relates to a method for biasing the acoustic transducer.

2. Description of the Related Art

As is known, an acoustic transducer of a capacitive type, for example a MEMS microphone, generally comprises a mobile electrode, in the form of a diaphragm or membrane, set facing a fixed electrode, so as to provide the plates of a variable-capacitance sensing capacitor. The mobile electrode is generally anchored, by means of a perimetral portion thereof, to a substrate, whilst a central portion thereof is free to move or bend in response to the pressure exerted by incident sound waves. The mobile electrode and the fixed electrode form a capacitor, and the bending of the membrane that constitutes the mobile electrode causes a variation of capacitance of said capacitor. In use, the capacitance variation, which is a function of the acoustic signal to be detected, is converted into an electrical signal, which is issued as output signal of the acoustic transducer.

In greater detail, and with reference to FIG. 1, a MEMS capacitive microphone 1, of a known type, comprises a substrate 2 made of semiconductor material, for example silicon; a cavity 3 (generally known as "back-chamber") is provided in the substrate 2, for example via a chemical etch from the backside. A membrane, or diaphragm, 4 is coupled to the substrate 2 and closes the back-chamber 3 at the top. The membrane 4 is flexible and, in use, deforms as a function of the pressure of the incident sound waves coming from the back-chamber 3. A rigid plate 5 (generally known as "back-plate") is set over and facing the membrane 4, via the interposition of spacers 6 (for instance made of insulating material, such as silicon oxide). The back-plate 5 constitutes the fixed electrode of a capacitor with variable capacitance, the mobile electrode of which is formed by the membrane 4; the back-plate 5 has a plurality of holes 7, for example with a circular section, designed to enable free circulation of air in the direction of the membrane 4.

Capacitive microphones, and in particular MEMS microphones, receive an appropriate electrical biasing so as to be used as transducers of acoustic signals into electrical signals. In particular, in order to guarantee a level of performance sufficient for the usual applications, the microphones are biased at high voltages (for example 15 V-20 V), typically much higher than those at which a corresponding reading circuit is supplied (logic voltages of, for example, 1.6 V-3 V). For this purpose, it is common to use charge-pump voltage-boosting circuits (generally known as "charge pumps"), made using integrated technology, which are able to generate high voltages starting from reference voltages of lower value.

A common circuit configuration (illustrated in FIG. 2) envisages that a charge-pump stage, illustrated schematically and designated as a whole by 8, is directly connected to a first terminal N1 (constituted, for example, by the back-plate 5) of the MEMS microphone 1 (represented schematically by the equivalent circuit of a variable-capacitance capacitor), so as to supply biasing voltages of high value. A second terminal N2 (for example, constituted by the membrane 4) of the MEMS microphone 1 is instead connected to the high-impedance input of a reading circuit (also defined as "front-end circuit"), in the figure represented schematically as an amplifier stage 9 (the high impedance of which is in turn represented schematically by an input resistor 10 having a resistance typically comprised between 100 GΩ and 100 TΩ, connected between the second terminal N2 and a reference-voltage node, e.g., coinciding, as in the case illustrated, with the ground of the biasing circuit).

This circuit arrangement is, however, considerably limited by the reduced signal-to-noise ratio since, during normal operation, both a possible "ripple" at the output of the charge-pump stage 8 and the noise generated by the same charge pump add, without any attenuation, to the electrical signal generated by the MEMS microphone 1 as a function of the detected acoustic signal.

To overcome the above limitation, an alternative circuit arrangement has been proposed (shown in FIG. 3), in which a low-pass filter 12, in RC configuration, is set between the output of the charge-pump stage 8 and the first terminal N1 of the MEMS microphone 1 so as to appropriately attenuate both the ripple and the noise at output from the charge-pump stage. In particular, the low-pass filter 12 is made by a filter resistor 13, connected between the output of the charge-pump stage 8 and the first terminal N1 of the MEMS microphone 1, and by a filter capacitor 14, connected between the same first terminal N1 and a ground terminal of the biasing circuit.

It has, however, been shown that, in order for the low-pass filtering action to be effective and be able to obtain an appropriate biasing of the MEMS microphone 1, the low-pass filter 12 should have a pole at a frequency equal to or preferably lower than 1 Hz. For this purpose, the filter resistor 13 should have a resistance of extremely high value, for example comprised between 100 GΩ and 100 TΩ.

Given that, as it is known, it is not possible, in integrated-circuit technology, to obtain resistors with such high resistances, the use of non-linear devices capable of providing the high values of resistance has been proposed. For example, for this purpose it has been proposed the use of a pair of diodes in anti-parallel configuration, providing a sufficiently high resistance when a voltage drop of contained value is set across them (the value depending on the technology, for example being less than 100 mV).

As illustrated in FIG. 4, both the filter resistor 13 and the input resistor 10 can hence be provided by a respective pair of diodes in anti-parallel configuration.

In particular, the filter resistor 13 is provided by a first diode 13a, with its anode connected to the output of the charge-pump stage 8 and its cathode connected to the first terminal N1, and by a second diode 13b, with its anode connected to the first terminal N1 and its cathode connected to the output of the charge-pump stage 8. The input resistor 10 is provided by a respective first diode 10a, with its cathode connected to the second terminal N2 and its anode connected to the reference voltage, designated here by Vref, and by a respective second diode 10b, with its cathode connected to the reference voltage Vref and its anode connected to the second terminal N2.

The main problem of such a circuit architecture is represented by the long start-up time of the biasing circuit in general and of the low-pass filter 12 in particular, principally due to the presence of the pair of diodes connected in anti-parallel configuration and to the high resistance provided thereby. The settling time of such a configuration can easily last minutes or even hours. Before the end of this settling time, i.e., for the entire start-up time of the circuit, proper operation of the low-pass filter 12 cannot be guaranteed, nor likewise can proper biasing of the terminals N1, N2 of the MEMS microphone 1 be guaranteed. Hence, during the start-up time, inevitably even considerable variations occur in the sensitivity associated to the MEMS microphone 1, as detected by the reading circuit.

In particular, as illustrated in FIG. 5, the voltage of the first terminal N1 (designated by V1) moves slowly towards the desired biasing voltage value, equal to the pump voltage supplied by the charge-pump stage 8 (designated as Vcp), whilst the voltage of the second terminal N2 (designated as V2) moves slowly towards the value of the reference voltage Vref (in FIG. 5 the voltage drop across the pair of diodes in anti-parallel configuration 10a, 10b is designated as Vd). Only at the end of the long start-up time do the voltages of the first and second terminals N1, N2 stabilize at the desired biasing voltages (steady-state situation).

Clearly, such long delay times are not acceptable in the common situations of use of the MEMS microphone 1 when, instead, it is necessary to guarantee the nominal performance (and, in particular, a substantially constant sensitivity) with extremely brief delays both in turning-on of the electronic device incorporating the MEMS microphone and upon return from a so-called "power-down" condition (during which the device is partially turned off to ensure an energy-saving condition).

As a possible solution to this further problem (as illustrated in FIG. 6), the use of a highpass-filter stage 15 has also been proposed, connected in series to the output of the amplifier stage 9 (which constitutes the first signal-processing stage of the reading circuit associated to the MEMS microphone 1) so as to "mask" the long settling time of the biasing circuit. However, also this solution is not free from drawbacks, in particular as regards the greater occupation of area, the circuit complexity of the resulting reading interface, and the possible distortions introduced by the further filtering stage.

BRIEF SUMMARY

One embodiment provides a biasing circuit for an acoustic transducer that enables the above drawbacks to be overcome.

According to the present disclosure, a biasing circuit for an acoustic transducer and a corresponding biasing method are consequently provided.

BRIEF DESCRIPTION OF THE SEVERAL VIEWS OF THE DRAWINGS

For a better understanding of the present disclosure, preferred embodiments thereof are now described, purely by way of non-limiting example and with reference to the annexed drawings, wherein:

FIG. 1 is a schematic cross section of a capacitive acoustic transducer of a known type;

FIG. 2 is a block diagram of a biasing circuit of the MEMS microphone of a known type;

FIG. 3 shows a block diagram of a further biasing circuit of a known type;

FIG. 4 shows a possible implementation of the biasing circuit of FIG. 3 in integrated technology;

FIG. 5 shows a plot of some electrical quantities in the biasing circuit of FIG. 4;

FIG. 6 shows a variant embodiment, which is also of a known type, of the biasing circuit of FIG. 4;

DETAILED DESCRIPTION

As will be clarified hereinafter, one aspect of the present disclosure envisages introduction, for the biasing circuit of an acoustic transducer, in particular a MEMS microphone of a capacitive type, of an operating state during a start-up step (occurring upon turning-on or return from a power-down condition), in which one or both of the terminals of the MEMS microphone are brought directly to desired biasing voltages so as to enable a rapid settling of the voltages of the same terminals (and an initialization of a filtering stage coupled to the acoustic transducer). At the end of the start-up step (which can consequently be much faster than in traditional solutions), one or both of the terminals of the MEMS microphone are connected to a high impedance, whether it is associated to a filter resistor or to the input of a corresponding reading amplifier stage.

Figure 7:
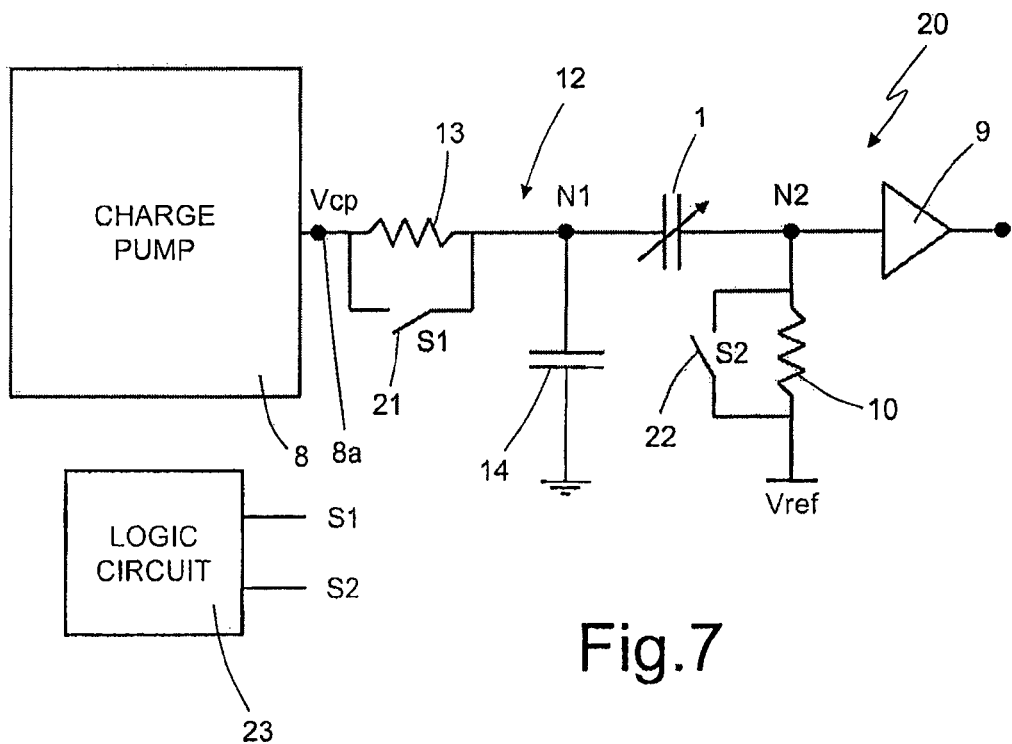
FIG. 7 shows a schematic block diagram of a biasing circuit of a capacitive acoustic transducer according to one aspect of the present disclosure.

In particular, as illustrated in FIG. 7 (where elements that are similar to others already described are designated by the same reference numbers), one embodiment of a biasing circuit according to the present disclosure, designated as a whole by 20, once again envisages the use of a low-pass filter 12, set between the output terminal of the charge-pump stage 8, designated here by 8a, and the first terminal N1 of the MEMS microphone 1, the second terminal N2 of which is again connected to the input resistor 10 of an amplifier stage 9.

Unlike the biasing circuits of a known type (for example, of the type illustrated in FIG. 3), this embodiment envisages the use of: a first switch 21, which is connected in parallel to the filter resistor 13 and can hence be actuated selectively to provide a direct low-impedance connection between the first terminal N1 of the MEMS microphone 1 and the output terminal 8a of the charge-pump stage 8 (set at the pump voltage Vcp); and a second switch 22, which is connected in parallel to the input resistor 10 and can hence be actuated selectively to provide a direct low-impedance connection between the second terminal N2 of the MEMS microphone 1 and the reference voltage Vref.

In particular, the first and second switches 21, 22 receive appropriate control signals (designated by S1 and S2 in FIG. 7) from a control logic 23 (which is illustrated schematically and, for example, comprises appropriate counters and timers), in such a way as to remain closed during a start-up step of the biasing circuit 20 and thus provide a rapid settling of the voltages of the terminals N1 and N2 of the MEMS microphone 1 at the desired biasing values, and in such a way as to remain open during a subsequent step of normal operation of the biasing circuit 20, thus providing both proper biasing of the terminals N1, N2 and the filtering operation by the low-pass filter 12 at output from the charge-pump stage 8. The start-up step terminates only after the terminals N1 and N2 of the MEMS microphone 1 have reached the desired biasing voltage, the pump voltage Vcp and the reference voltage Vref, respectively. In this way, it is further possible to "reset" the filter, i.e., place the low-pass filter 12 in the right region of operation with minimum delay from turning-on or the return from a power-down condition.

In greater detail, timing of the control signals S1 and S2 (which can be equal or slightly out of phase to guarantee a greater resistance to variations of the system parameters) is generated by the control logic 23 in such a way as to provide their switching from the high level to the low level only once the pump voltage Vcp has effectively reached its final steady-state value.

Figure 8:
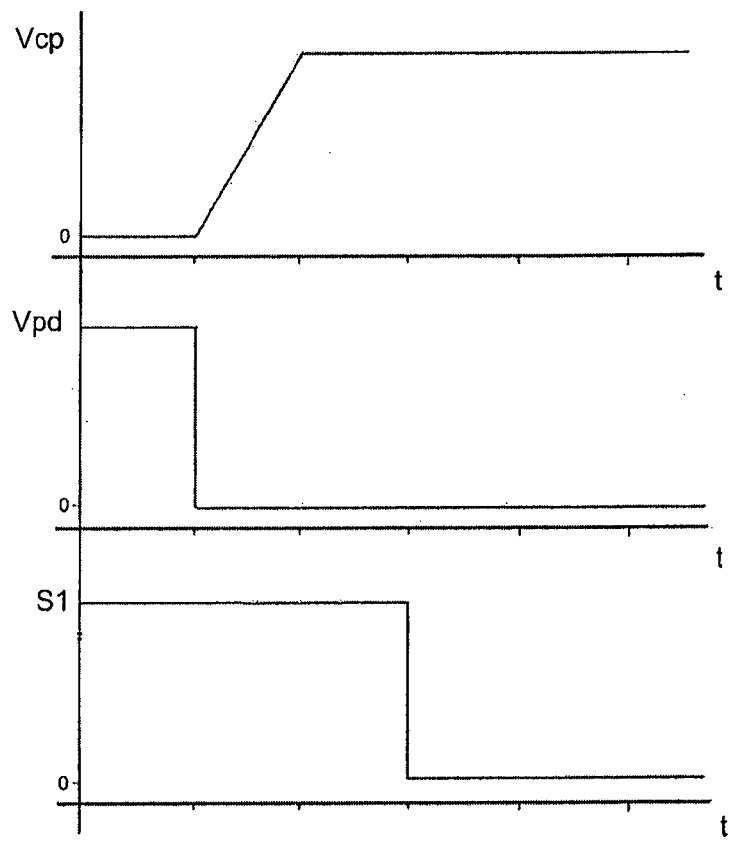
FIG. 8 shows the plot of some electrical quantities in the circuit of FIG. 7.

For instance, FIG. 8 shows a possible timing of the control signal S1 that respects this condition (the control signal S2 can in this case be the same as the control signal S1). In particular, in this case, at exit from the power-down condition (when the power-down signal PD, indicative of this condition, switches from the high value to the low value), the control signal S1 remains high for a time sufficient to provide that the charge-pump stage 8 has reached the right working point (and hence that the pump voltage Vcp has reached the final steady-state value). Only once this delay interval has elapsed does the control signal S1 switch to the low value, opening the respective switch.

This timing condition may be provided, for example, using in the control logic 23 a digital counter, which, starting from the power-down signal PD and the clock signal CK will generate the control signal S1, switching after a sufficient time delay with respect to the switching of the power-down signal PD. Alternatively, it is possible to use a signal different from the power-down signal PD for starting the digital counter.

Figure 9:
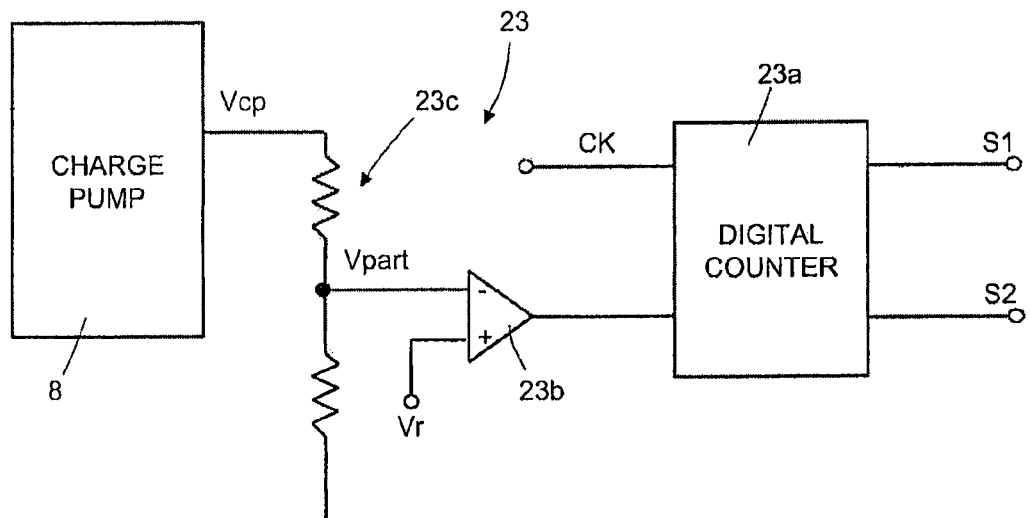
FIG. 9 is a schematic illustration of a possible circuit embodiment of a logic timing circuit present in the circuit of FIG. 7.

A possible alternative solution is, for example, illustrated in FIG. 9. In this solution, the control logic 23 includes a digital counter 23a, which receives a clock signal CK and supplies at output the control signals S1, S2. The starting signal for the digital counter 23a is generated by a threshold comparator 23b, which compares a partition voltage Vpart obtained from the pump voltage Vcp at output from the charge-pump stage 8 by means of a resistive divider 23c, with a comparison voltage Vr having a desired reference value.

In use, the digital counter 23b starts counting only after the pump voltage Vcp has exceeded a certain level (which in general is established as being close to the steady-state level) so as to provide that switching from high level to low level of the control signals S1, S2 will occur, after an appropriate delay, after the charge-pump stage 8 has reached the steady state condition.

A further aspect of the present disclosure envisages the provision of a circuit implementation of the switches 21, 22, such as to prevent introduction of parasitic elements that might jeopardize the performance of the low-pass filter 12 in conditions of normal operation. This circuit implementation envisages again the use of a pair of diodes in anti-parallel configuration for provision of the filter resistor 13 and of the input resistor 10, and moreover the appropriate use of (N-channel or P-channel) MOS transistors for implementing both of the diodes in anti-parallel configuration and the switches 21, 22.

Figure 10:
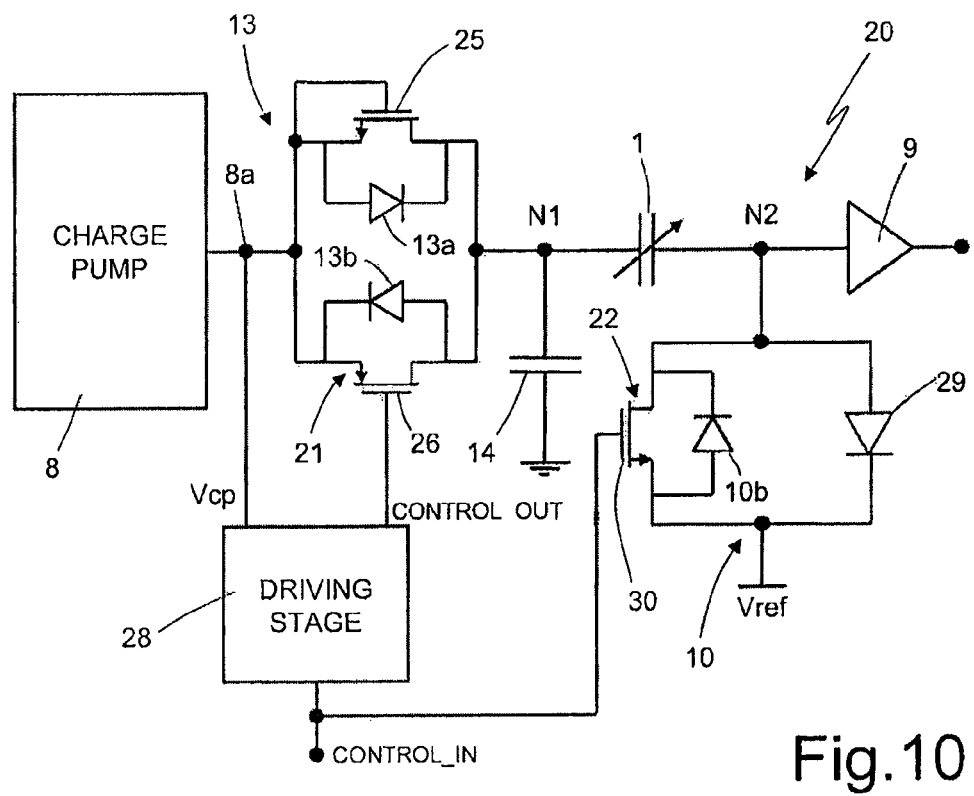
FIG. 10 shows a possible embodiment of the biasing circuit of FIG. 7.

In greater detail, and with reference to FIG. 10, the biasing circuit 20 comprises: a first nMOS transistor 25, in diode configuration, which is connected between the output terminal 8a of the charge-pump stage 8 and the first terminal N1 of the MEMS microphone 1 and has its gate terminal connected to the drain terminal; and a pMOS transistor 26, which is connected in parallel to the first nMOS transistor 25 between the output terminal 8a of the charge-pump stage 8 and the first terminal N1 and has its gate terminal receiving an output control signal CONTROL_OUT (generated as described in what follows).

The first nMOS transistor 25 is always in an OFF state so as to provide (as illustrated schematically in FIG. 10) the first diode 13a of the diodes in anti-parallel configuration that are to implement the filter resistance 13.

The pMOS transistor 26, according to the level of the output control signal CONTROL_OUT, can be either in the OFF state so as to provide (by means of the respective intrinsic body diode) the second diode 13b, connected in anti-parallel configuration to the first diode 13a, with which it implements the filter resistance 13, or else in the ON state so as to enable direct biasing (with low ON-resistance Ron) of the first terminal N1 at the pump voltage Vcp and enable a rapid settling of the voltage of the same terminal during the start-up step. The pMOS transistor 26 hence performs a dual function, implementing in the biasing circuit 20 both the second diode 13b of the filter resistor 13 and the first switch 21 that is connected in parallel to the same filter resistor 13 and is designed to short-circuit this resistor.

The biasing circuit 20 further comprises a high-voltage driving stage 28, having a first input terminal receiving the pump voltage Vcp and a second input terminal receiving an input control signal CONTROL_IN, which has logic voltage values (a low logic value, for example equal to 0 V, and a high logic value, equal to the logic supply voltage VDD, for example 1.6 V-3 V). The input control signal CONTROL_IN is, for example, appropriately generated by the control logic 23 (corresponding, for example, to the first control signal S1 or to the second control signals S2).

The high-voltage driving stage 28 is configured so as to generate (as described in detail in what follows) the output control signal CONTROL_OUT starting from the input control signal CONTROL_IN, referred to the pump voltage Vcp, thus having two levels of voltage adapted to driving of the pMOS transistor 26 of the low-pass filter 12. For instance, the output control signal CONTROL_OUT switches between the high or low voltage levels synchronous with the input control signal CONTROL_IN.

The biasing circuit 20 further comprises: a diode element 29, which can be obtained, for example, by means of a BJT transistor in diode configuration (which provides the first diode 10a of the diodes in anti-parallel configuration that are to implement the input resistance 10), which is connected between the second terminal N2 of the MEMS microphone 1 and the node at the reference voltage Vref; and a third nMOS transistor 30, which is connected in parallel to the diode element 29 between the second terminal N2 of the MEMS microphone 1 and the node at the reference voltage Vref and has its gate terminal receiving the input control signal CONTROL_IN, i.e., the same control signal supplied at input to the high-voltage driving stage 28.

The third nMOS transistor 30, according to the state of the input control signal CONTROL_IN, can be either in the OFF state so as to provide (by means of the respective intrinsic body diode) the second diode 10b connected in anti-parallel configuration to the first diode 10a with which it implements the input resistance 10, or else in the ON state so as to enable direct biasing (with low ON-resistance Ron) of the second terminal N2 at the reference voltage Vref and enable a fast settling of the voltage of the same terminal during the start-up step. Also the third nMOS transistor 30 hence performs a dual function, implementing in the biasing circuit 20 both the second diode 10b of the input resistor 10 and the second switch 22 that is connected in parallel to the same input resistor 10 and is designed to short-circuit this resistor.

In use, the circuit configuration described enables extremely fast settling times of the terminals N1 and N2 of the MEMS microphone 1 to be obtained during the start-up step thanks to the presence of the switches 21, 22, as well as a correct low-pass filtering with a lower cutoff frequency of an extremely small value (of the mHz order) at the end of the start-up step, at the same time not presenting parasitic elements to the MEMS microphone 1.

Yet a further aspect of the present disclosure envisages provision of a particular circuit implementation of the high-voltage driving stage 28, having extremely low current absorption, so as not to jeopardize operation of the charge-pump stage 8.

Figure 11:
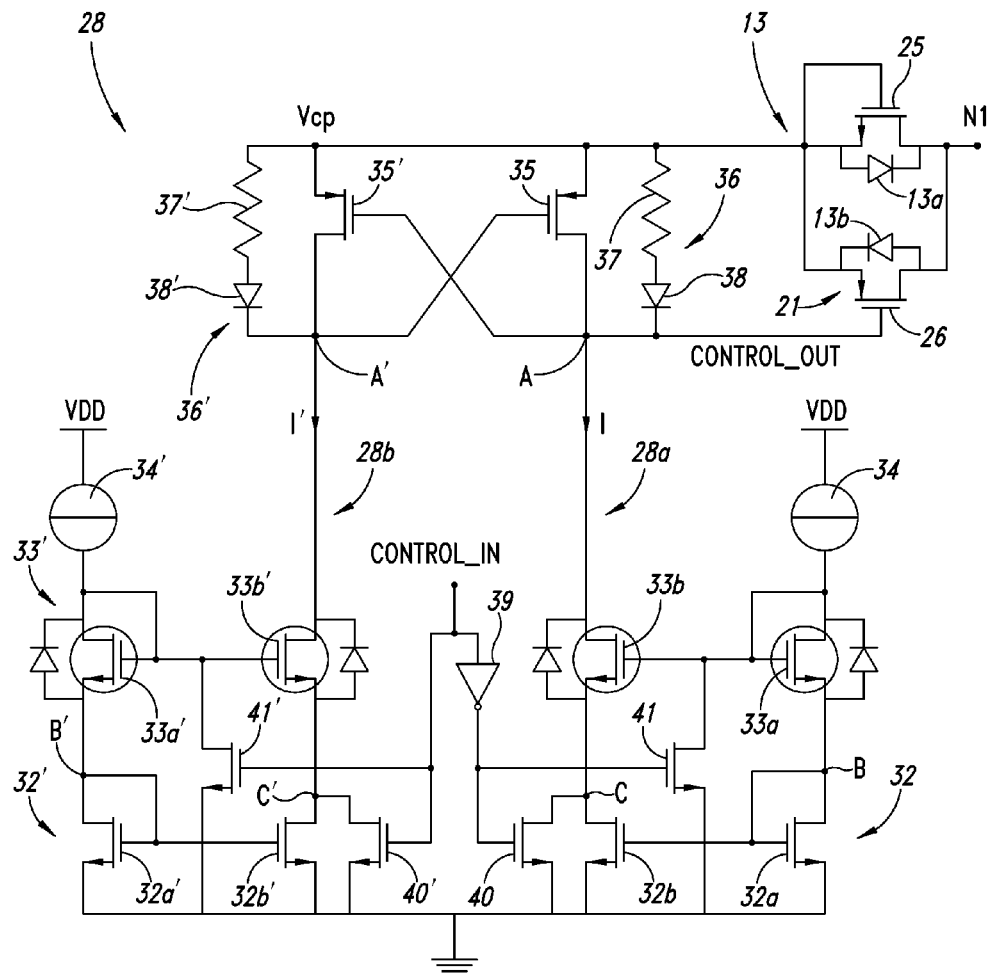
FIG. 11 shows a circuit embodiment of a driving stage in the biasing circuit of FIG. 10.

In greater detail, and with reference to FIG. 11, the high-voltage driving stage 28 has a circuit structure having two sides substantially symmetrical: a first one (defining the output branch) being connected to the output terminal of the high-voltage driving stage 28 (here coinciding with an internal node A) and to the gate terminal of the first nMOS transistor 26, to which it supplies the output control signal CONTROL_OUT.

The first side, designated by 28a, is described in detail hereinafter, a similar description not being repeated for the second side 28b (in so far as it is specular to the first branch 28a), the elements of which will be identified with the same reference numbers followed by a prime sign.

The first side 28a comprises a cascode current mirror 32 connected to a current generator 34 supplying a reference current, which, by means of an appropriate scaling factor, enables a biasing current I of a desired value to be obtained on the output branch.

In detail, the cascode current mirror 32 comprises: a first low-voltage nMOS transistor 32a, which is connected between a ground node and an internal node B and has its gate terminal connected to the drain terminal; a second low-voltage nMOS transistor 32b, which is connected between the ground node and an internal node C and has its gate terminal connected to the gate terminal of the first low-voltage nMOS transistor 32a; a first high-voltage nMOS transistor 33a, which is connected between the internal node B and the current generator 34 and has its gate terminal connected to the drain terminal; and a second high-voltage nMOS transistor 33b, which is connected between the internal node C and the internal node A and has its gate terminal connected to the gate terminal of the first high-voltage nMOS transistor 33a.

The first side 28a further comprises an output pMOS transistor 35 and an output branch 36 in parallel to the output pMOS transistor 35.

The output pMOS transistor 35 is connected between the internal node A and the first input terminal of the high-voltage driving stage 28 that receives the pump voltage Vcp, and has its gate terminal connected to the respective internal node A' of the second side 28b (the output pMOS transistors 35, 35' of the first side 28a and second side 28b, respectively, are consequently arranged in a "crossed" configuration, as illustrated in FIG. 11).

The output branch 36 is formed by the series connection of an output resistor 37 and an output diode 38, the latter having its anode connected to the output resistor 37 and its cathode connected to the internal node A.

The first side 28a is connected to the second input terminal of the high-voltage driving stage 28 (which receives the input control signal CONTROL_IN) by the interposition of a logic inverter 39 (the latter not being present in the second side 28b), and further comprises a first turning-off nMOS transistor 40 and a second turning-off nMOS transistor 41.

The first turning-off nMOS transistor 40 has its drain terminal connected to the common gate terminal of the high-voltage nMOS transistors 33a, 33b, its source terminal connected to the ground node, and its gate terminal connected to the output of the logic inverter 39. The second turning-off nMOS transistor 41 has its drain terminal connected to the internal node C, its source terminal connected to the ground node, and its gate terminal also connected to the output of the logic inverter 39.

In use, when the input control signal CONTROL_IN has a low logic value, the output of the logic inverter 39 goes to the high logic value, activating the first and the second turning-off nMOS transistors 40, 41 and thus deactivating the cascode current mirror 32 of the first side 28a, and generation of the biasing current I on the output branch. Instead, the cascode current mirror 32' of the second side 28b is active, generating the biasing current I' towards the internal node A' and causing turning-on of the output pMOS transistor 35 of the first side 28a. The voltage of the internal node A of the first side 28a substantially goes to the value of the pump voltage Vcp, thus bringing the output control signal CONTROL_OUT to the high value (substantially coinciding with the pump voltage Vcp).

In this situation (which corresponds to the step of normal operation of the biasing circuit 20), both the first switch 21 and the second switch 22 are open (in so far as the third nMOS transistor 30 is turned off by the low value of the input control signal CONTROL_IN and the pMOS transistor 26 is turned off by the high value of the output control signal CONTROL_OUT), thus enabling operation of the low-pass filter 12 and the customary biasing of the terminals N1, N2 of the MEMS microphone 1.

When, instead, the input control signal CONTROL_IN has a high logic value, the cascode current mirror 32 of the first side 28a is activated (and simultaneously the current mirror in the second side 28b is deactivated), thus generating the biasing current I on the internal node A of the first side 28a. In this case, the output pMOS transistor 35 of the first side 28a is off, and the biasing current I circulates in the output branch 36 (in the series constituted by the output resistor 37 and the output diode 38), bringing about a potential drop, the value of which, for example equal to 1 V-2 V, depends upon the value of the biasing current I and upon sizing of the same output resistor 37 and output diode 38. The voltage of the internal node A of the first side 28a hence goes to the value of the pump voltage Vcp minus this potential drop, thus bringing the output control signal CONTROL_OUT to an appropriate low logic value, referred to the pump voltage Vcp.

In this situation, which corresponds to the start-up step of the biasing circuit 20, both the first switch 21 and the second switch 22 are closed (in so far as the third nMOS transistor 30 is turned on by the high value of the input control signal CONTROL_IN and the pMOS transistor 26 is turned on by the low value of the output control signal CONTROL_OUT), thus enabling direct connection of the terminals N1, N2 of the MEMS microphone 1 to the respective biasing voltages.

In particular, the biasing current I generated by the cascode current mirror 32 can be set so as to render negligible the current absorption from the charge-pump stage 8 by the high-voltage driving stage 28; for example, the biasing current I can have a value lower than 10 nA.

The advantages of the circuit and of the biasing method according to the present disclosure emerge clearly from the foregoing description.

In particular, it is again emphasized that it is possible to reduce the noise at output from the charge-pump stage, exploiting the properties of the low-pass filter set between the charge-pump stage and the MEMS microphone, and at the same time not to sacrifice the turning-on and settling speed thanks to the described use of the switches, which are able to bring the terminals of the MEMS microphone rapidly to the biasing voltages (during the start-up step), thus providing a constant-charge biasing.

In other words, an extremely short turning-on time is obtained, and the sensitivity of the MEMS microphone is kept substantially constant, in particular preventing any drift of sensitivity during the start-up step.

The above solution enables avoidance of the use of a high-pass filter at output from the amplification stage of the read interface associated to the MEMS microphone, as well as of the known problems linked to the use of this component.

Furthermore, the biasing circuit described can be integrated using common analog technologies using high-voltage components, since it does not require particular components for its operation.

Figure 12:
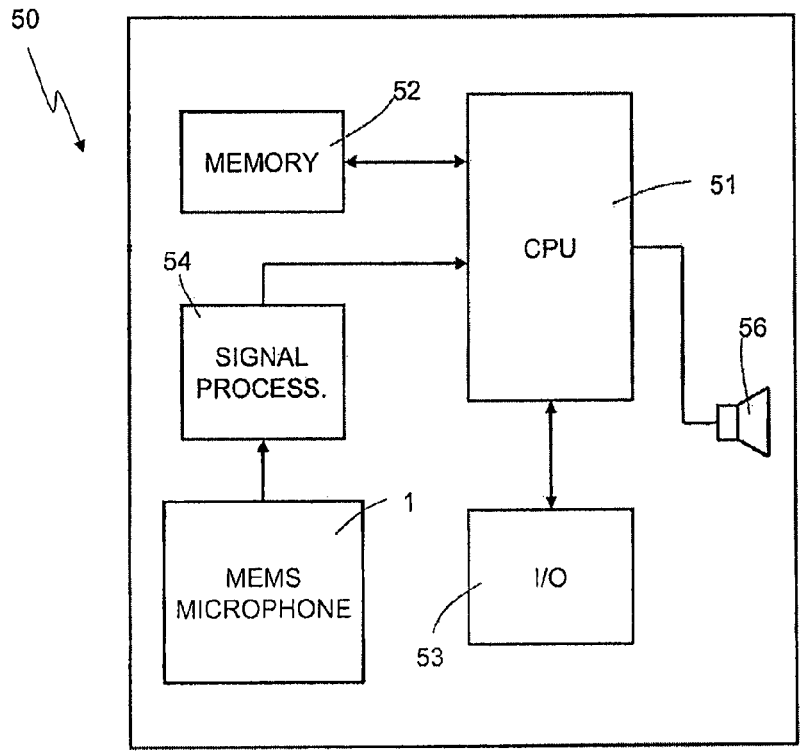
FIG. 12 shows a simplified block diagram of an electronic device equipped with a capacitive acoustic transducer and with the biasing circuit of FIG. 7.

The characteristics outlined above make the use of the biasing circuit 20 and of the corresponding MEMS microphone 1 particularly advantageous in an electronic device 50, as illustrated in FIG. 12 (the electronic device 50 may even comprise, in a way not illustrated, further MEMS microphones 1). The electronic device 50 is preferably a mobile communication device, such as for example a mobile phone, a PDA, a notebook, or also a voice recorder, a reader of audio files with voice-recording capability, etc. Alternatively, the electronic device 50 can be a hydrophone, capable of working under water, or else a hearing-aid device.

The electronic device 50 comprises a microprocessor 51, a memory block 52, connected to the microprocessor 51, and an input/output interface 53, which is for example provided with a keyboard and a video and is also connected to the microprocessor 51. The MEMS microphone 1 communicates with the microprocessor 51 via a signal-processing block 54, comprising the reading interface and, in particular, the amplifier 9 described previously. Furthermore, a loudspeaker 56 may be present for generating sounds on an audio output (not shown) of the electronic device 50.

Finally, it is clear that modifications and variations can be made to what has been described and illustrated herein, without thereby departing from the scope of the present disclosure.

Figure 13:
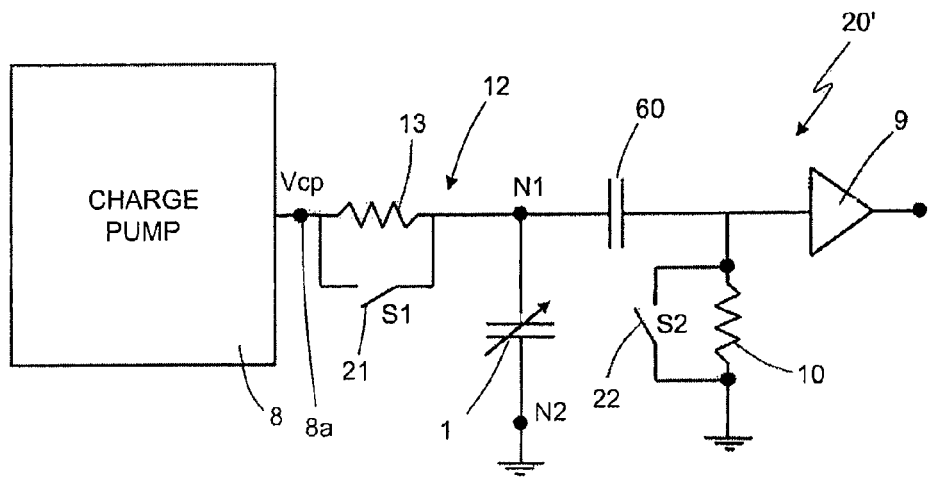
FIG. 13 shows a schematic block diagram of a biasing circuit of a capacitive acoustic transducer according to a further embodiment of the present disclosure.

In particular, as illustrated in FIG. 13, an alternative embodiment of the biasing circuit can be provided, designated here by 20', in which the first terminal N1 of the MEMS microphone 1 is again coupled electrically to the output terminal 8a of the charge-pump stage 8 (with the interposition of the filter resistor 13), whilst the second terminal N2 of the MEMS microphone 1 is connected to a reference potential (in particular to ground).

The low-pass filter 12 is hence constituted by the filter resistor 13, connected in parallel to which is again the first switch 21, and by the capacitance of the MEMS microphone 1, which hence performs a dual function of generation of the sensing signal and of noise filtering. A decoupling capacitor 60 is in this case connected between the first terminal N1 and the input of the amplifier stage 9 (and to the input resistor 10, connected in parallel to which is again the second switch 22). The decoupling capacitor 60 enables decoupling of the amplifier stage 9 from the charge-pump stage 8 and in particular blocking of d.c. voltages due to any disturbance or undesirable couplings.

This variant, in certain operating conditions, has the advantage of guaranteeing a greater robustness and a greater simplicity of assembly in so far as it enables use of just one pad for electrical connection of the MEMS microphone 1 to the corresponding integrated circuit.

Furthermore, the biasing circuit according to the present disclosure can be advantageously used with different types of capacitive acoustic transducers, both traditional ones and MEMS ones.

Different circuit implementations can be envisaged for the high-voltage driving stage.

In addition, the resistor at input to the amplification stage associated to the MEMS microphone may not be formed by a pair of anti-parallel diodes, but simply correspond to the high input impedance of the same amplification stage, which is appropriately short-circuited during the start-up step, as described previously.

Finally, the biasing circuit may possibly envisage just one switch element coupled to the first terminal of the MEMS microphone connected to the low-pass filter.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A biasing circuit, comprising:
an output terminal configured to be coupled to an acoustic transducer;
a biasing terminal configured to receive from a voltage-booster stage a boosted voltage for biasing the output terminal;
a filter coupled between the biasing terminal and said output terminal, and configured to implement filtering of disturbances on said boosted voltage;
a first switch configured to provide a current path between said biasing terminal and said output terminal during a start-up step of said biasing circuit, and configured to allow the filter to filter the disturbances once said start-up step has terminated, the first switch having a control terminal; and
a control stage having a first output terminal electrically coupled to the control terminal of the first switch, the control stage being configured to provide a first control signal at the first output terminal of the control stage and control the first switch with the first control signal;
a high-impedance resistor element;
an amplifier having an input and configured to process an electrical output quantity of said acoustic transducer; and
a second switch connected in parallel to said high-impedance resistor element, the second switch having a control terminal electrically coupled to a second output terminal of the control stage and being configured to short-circuit said high-impedance resistor element during said start-up step and couple said input of the amplifier to a reference-voltage line.

2. The circuit according to claim 1, wherein the control stage is configured to determine an end of said start-up step and control opening of said first switch once said output terminal reaches a desired biasing voltage.

3. The circuit according to claim 1, wherein said filter includes a high-impedance resistor element set between said biasing terminal and said output terminal; and wherein said first switch is connected in parallel to said high-impedance resistor element and is configured to short-circuit said high-impedance resistor element during said start-up step.

4. The circuit according to claim 1, wherein said high-impedance resistor element includes a first diode element; and wherein said second switch includes a transistor configured to operate, in a first operating condition, as a second diode element, connected in anti-parallel configuration to said first diode element so as to define said high-impedance resistor element, and, in a second operating condition, as a low-impedance connection between said input and said reference-voltage line, short-circuiting said high-impedance resistor element.

5. The circuit according to claim 1, wherein the output terminal is configured to be coupled to an acoustic transducer, the circuit further comprising:
   an amplifier configured to process an electrical output quantity of said acoustic transducer; and
   a decoupling capacitor coupled between the output terminal and the amplifier.

6. A biasing circuit, comprising:
   an output terminal;
   a biasing terminal configured to receive from a voltage-booster stage a boosted voltage for biasing the output terminal;
   a filter coupled between the biasing terminal and said output terminal, and configured to implement filtering of disturbances on said boosted voltage;
   a first switch configured to provide a current path between said biasing terminal and said output terminal during a start-up step of said biasing circuit, and configured to allow the filter to filter the disturbances once said start-up step has terminated, the first switch having a control terminal; and
   a control stage having a first output terminal electrically coupled to the control terminal of the first switch, the control stage being configured to provide a first control signal at the first output terminal of the control stage and control the first switch with the first control signal, wherein:
      the control stage is configured to determine an end of said start-up step and control opening of said first switch once said output terminal reaches a desired biasing voltage, and
      said control stage comprises a counter configured to determine a time interval such that said biasing voltage substantially corresponds to a steady-state value of said boosted voltage generated by said voltage-booster stage.

7. A biasing circuit, comprising:
   an output terminal;
   a biasing terminal configured to receive from a voltage-booster stage a boosted voltage for biasing the output terminal;
   a filter coupled between the biasing terminal and said output terminal, and configured to implement filtering of disturbances on said boosted voltage;
   a first switch configured to provide a current path between said biasing terminal and said output terminal during a start-up step of said biasing circuit, and configured to allow the filter to filter the disturbances once said start-up step has terminated, the first switch having a control terminal; and
   a control stage having a first output terminal electrically coupled to the control terminal of the first switch, the control stage being configured to provide a first control signal at the first output terminal of the control stage and control the first switch with the first control signal, wherein:
      said filter includes a high-impedance resistor element set between said biasing terminal and said output terminal;
      said first switch is connected in parallel to said high-impedance resistor element and is configured to short-circuit said high-impedance resistor element during said start-up step; and
      said high-impedance resistor element includes a first diode element, and wherein said first switch includes a transistor configured to operate, in a first operating condition, as a second diode element, connected in anti-parallel configuration to said first diode element so as to define said high-impedance resistor element, and, in a second operating condition, as a low-impedance connection between said first terminal and said biasing terminal, short-circuiting said high-impedance resistor element.

8. A biasing circuit, comprising:
   an output terminal;
   a biasing terminal configured to receive from a voltage-booster stage a boosted voltage for biasing the output terminal;
   a filter coupled between the biasing terminal and said output terminal, and configured to implement filtering of disturbances on said boosted voltage;
   a first switch configured to, provide a current path between said biasing terminal and said output terminal during a start-up step of said biasing circuit, and configured to allow the filter to filter the disturbances once said start-up step has terminated, the first switch having a control terminal; and
   a control stage having a first output terminal electrically coupled to the control terminal of the first switch, the control stage being configured to provide a first control signal at the first output terminal of the control stage and control the first switch with the first control signal, wherein the control stage is configured to receive said boosted voltage and a timing signal, and to supply said first control signal with a high level, substantially coinciding with said boosted voltage, and a low level, lower than said boosted voltage by a voltage drop.

9. The circuit according to claim 8, wherein said control stage has a circuit structure with substantially symmetrical first and second sides, the first side being coupled to the first output terminal of said control stage and including:
   a current-mirror stage coupled to said first output terminal of the control stage and configured to generate a biasing current; and
   an output branch including a parallel circuit of an output transistor and a resistive network and configured to receive said boosted voltage; said current-mirror stage being configured to be alternately enabled and disabled by said timing signal, said resistive network being configured to generate said voltage drop with respect to said boosted voltage and said low level of said first control signal in response to the biasing current being provided to the resistive network by the current-mirror stage when the current-mirror stage is enabled by the timing signal, and said output transistor being configured to bring said first control signal at said output to said boosted voltage in response to the current-mirror stage being disabled by the timing signal.

10. The circuit according to claim 9, wherein said control stage comprises a transistor element configured to be controlled by said timing signal and configured to disable said current-mirror stage.

11. The circuit according to any claim 8, wherein said control stage is configured to cause a current absorption from said voltage-booster stage not higher than 10 nA.

12. An electronic device, comprising:
an acoustic transducer;
a voltage-booster stage configured to provide a boosted voltage; and
a biasing circuit coupled to the acoustic transducer and configured to bias said acoustic transducer, the biasing circuit including:
 a biasing terminal configured to receive the boosted voltage from the voltage-booster stage;
 a filter coupled between the biasing terminal and the first terminal of said acoustic transducer, and configured to implement filtering of disturbances on said boosted voltage;
 a first switch configured to provide a current path between said biasing terminal and the first terminal during a start-up step of said biasing circuit, and configured to allow the filter to filter the disturbances once said start-up step has terminated, the first switch having a control terminal; and
 a control stage having a first output terminal electrically coupled to the control terminal of the first switch, the control stage being configure to provide a first control signal at the first output terminal and control the first switch with the first control signal, wherein the control stage is configured to receive said boosted voltage and a timing signal and to supply said control signal with a high level, substantially coinciding with said boosted voltage, and a low level, lower than said boosted voltage by a voltage drop.

13. The device according to claim 12, wherein said acoustic transducer is a capacitive MEMS microphone; said electronic device being in the group consisting: a mobile phone, a PDA, a notebook, a voice recorder, an audio reader with voice-recording functions, a video game console, a hydrophone, and a hearing-aid device.

14. The device according to claim 12, wherein the control stage is configured to determine an end of said start-up step and control opening of said first switch once said first terminal of said acoustic transducer reaches a desired biasing voltage.

15. The device according to claim 14, wherein said control stage comprises a counter configured to determine a time interval such that said biasing voltage substantially corresponds to a steady-state value of said boosted voltage generated by said voltage-booster stage.

16. The device according to claim 12, wherein said filter includes a high-impedance resistor element set between said biasing terminal and said first terminal of said acoustic transducer; and wherein said first switch is connected in parallel to said high-impedance resistor element and is configured to short-circuit said high-impedance resistor element during said start-up step.

17. The device according to claim 16, wherein said high-impedance resistor element includes a first diode element, and wherein said first switch includes a transistor configured to operate, in a first operating condition, as a second diode element, connected in anti-parallel configuration to said first diode element so as to define said high-impedance resistor element, and, in a second operating condition, as a low-impedance connection between said first terminal and said biasing terminal, short-circuiting said high-impedance resistor element.

18. The device according to 12, wherein said control stage has a circuit structure with substantially symmetrical first and second sides, the first side being coupled to the first output terminal of said control stage and including:
 a current-mirror stage coupled to said first output terminal and configured to generate a biasing current; and
 an output branch including a parallel circuit of an output transistor and a resistive network and configured to receive said boosted voltage; said current-mirror stage being configured to be alternately enabled and disabled by said timing signal, said resistive network being configured to generate said voltage drop with respect to said boosted voltage and said low level of said first control signal in response to the biasing current being provided to the resistive network by the current-mirror stage when the current-mirror stage is enabled by the timing signal, and said output transistor being configured to bring said first control signal at said first output terminal to said boosted voltage in response to the current-mirror stage being disabled by the timing signal.

19. The device according to claim 12, further comprising:
a high-impedance resistor element;
an amplifier having an input and configured to process an electrical output quantity of said acoustic transducer; and
a second switch connected in parallel to said high-impedance resistor element, the second switch having a control terminal electrically coupled to a second output terminal of the control stage and being configured to short-circuit said high-impedance resistor element during said start-up step and couple said input of the amplifier to a reference-voltage line.

20. The device according to claim 19, wherein said high-impedance resistor element includes a first diode element; and wherein said second switch includes a transistor configured to operate, in a first operating condition, as a second diode element, connected in anti-parallel configuration to said first diode element so as to define said high-impedance resistor element, and, in a second operating condition, as a low-impedance connection between said input and said reference-voltage line, short-circuiting said high-impedance resistor element.

21. The device according to claim 12, wherein the acoustic transducer includes a second terminal coupled to a reference terminal and the biasing circuit includes:
an output coupled to the first terminal of the acoustic transducer;
an amplifier configured to process an electrical output quantity of said acoustic transducer; and
a decoupling capacitor coupled between the output and the amplifier.

22. A biasing circuit for an acoustic transducer, comprising:
a biasing terminal configured to receive from a voltage-booster stage a boosted voltage for biasing a first terminal of said acoustic transducer;
a filter coupled to the biasing terminal, configured to be set between said biasing terminal and said acoustic transducer, and configured to implement filtering of disturbances on said boosted voltage;
a first switch configured to provide a current path between said biasing terminal and said first terminal during a start-up step of said biasing circuit, and configured to allow the filter to filter the disturbances once said start-up step has terminated; and
a control stage configured to determine an end of said start-up step and control opening of said first switch once said first terminal of said acoustic transducer reaches a desired biasing voltage, wherein said control stage comprises a counter configured to determine a time interval such that said biasing voltage substantially corresponds to a steady-state value of said boosted voltage generated by said voltage-booster stage.

23. The circuit according to claim 22, wherein said filter includes a high-impedance resistor element set between said biasing terminal and said first terminal of said acoustic transducer; and wherein said first switch is connected in parallel to said high-impedance resistor element and is configured to short-circuit said high-impedance resistor element during said start-up step.

24. A biasing circuit for an acoustic transducer, comprising:
a biasing terminal configured to receive from a voltage-booster stage a boosted voltage for biasing a first terminal of said acoustic transducer;
a filter coupled to the biasing terminal, configured to be set between said biasing terminal and said acoustic transducer, and configured to implement filtering of disturbances on said boosted voltage; and
a first switch configured to provide a current path between said biasing terminal and said first terminal during a start-up step of said biasing circuit, and configured to allow the filter to filter the disturbances once said start-up step has terminated, wherein:
said filter includes a high-impedance resistor element set between said biasing terminal and said first terminal of said acoustic transducer;
said first switch is connected in parallel to said high-impedance resistor element and is configured to short-circuit said high-impedance resistor element during said start-up step;
said high-impedance resistor element includes a first diode element; and
said first switch includes a transistor configured to operate, in a first operating condition, as a second diode element, connected in anti-parallel configuration to said first diode element so as to define said high-impedance resistor element, and, in a second operating condition, as a low-impedance connection between said first terminal and said biasing terminal, short-circuiting said high-impedance resistor element.

25. The circuit according to claim 24, further comprising a control stage configured to receive said boosted voltage and a timing signal, and to supply at an output of the control stage a control signal to a control terminal of said first switch; said control signal having a high level, substantially coinciding with said boosted voltage, and a low level, lower than said boosted voltage by a voltage drop.

26. A biasing circuit for an acoustic transducer, comprising:
a biasing terminal configured to receive from a voltage-booster stage a boosted voltage for biasing a first terminal of said acoustic transducer;
a filter coupled to the biasing terminal, configured to be set between said biasing terminal and said acoustic transducer, and configured to implement filtering of disturbances on said boosted voltage;
a first switch configured to provide a current path between said biasing terminal and said first terminal during a start-up step of said biasing circuit, and configured to allow the filter to filter the disturbances once said start-up step has terminated; and
a control stage configured to receive said boosted voltage and a timing signal, and to supply at an output of the control stage a control signal to a control terminal of said first switch; said control signal having a high level, substantially coinciding with said boosted voltage, and a low level, lower than said boosted voltage by a voltage drop.

27. The circuit according to claim 26, wherein said control stage has a circuit structure with substantially symmetrical first and second sides, the first side being coupled to the output of said control stage and including:
a current-mirror stage coupled to said output and configured to generate a biasing current; and
an output branch including a parallel circuit of an output transistor and a resistive network and configured to receive said boosted voltage; said current-mirror stage being configured to be alternately enabled and disabled by said timing signal, said resistive network being configured to generate said voltage drop with respect to said boosted voltage and said low level of said control signal in response to the biasing current being provided to the resistive network by the current-mirror stage when the current-mirror stage is enabled by the timing signal, and said output transistor being configured to bring said control signal at said output to said boosted voltage in response to the current-mirror stage being disabled by the timing signal.

28. The circuit according to claim 27, wherein said control stage comprises a transistor element configured to be controlled by said timing signal and configured to disable said current-mirror stage.

29. A biasing circuit for an acoustic transducer, comprising:
a biasing terminal configured to receive from a voltage-booster stage a boosted voltage for biasing a first terminal of said acoustic transducer;
a filter coupled to the biasing terminal, configured to be set between said biasing terminal and said acoustic transducer, and configured to implement filtering of disturbances on said boosted voltage;
a first switch configured to provide a current path between said biasing terminal and said first terminal during a start-up step of said biasing circuit, and configured to allow the filter to filter the disturbances once said start-up step has terminated
a high-impedance resistor element;
an amplifier having an input and configured to process an electrical output quantity of said acoustic transducer; and
a second switch connected in parallel to said high-impedance resistor element and configured to short-circuit said high-impedance resistor element during said start-up step and couple said input of the amplifier to a reference-voltage line, wherein said high-impedance resistor element includes a first diode element; and wherein said second switch includes a transistor configured to operate, in a first operating condition, as a second diode element, connected in anti-parallel configuration to said first diode element so as to define said high-impedance resistor element, and, in a second operating condition, as a low-impedance connection between said input and said reference-voltage line, short-circuiting said high-impedance resistor element.

30. The circuit according to claim 29, further comprising:
an output configured to be coupled to the first terminal of the acoustic transducer;
an amplifier configured to process an electrical output quantity of said acoustic transducer; and
a decoupling capacitor coupled between the output and the amplifier.

31. An electronic device, comprising:
an acoustic transducer;
a voltage-booster stage configured to provide a boosted voltage; and
a biasing circuit coupled to the acoustic transducer and configured to bias said acoustic transducer, the biasing circuit including:
a biasing terminal configured to receive the boosted voltage from the voltage-booster stage;
a filter coupled between the biasing terminal and the first terminal of said acoustic transducer, and configured to implement filtering of disturbances on said boosted voltage;
a first switch configured to provide a current path between said biasing terminal and the first terminal during a start-up step of said biasing circuit, and configured to allow the filter to filter the disturbances once said start-up step has terminated, wherein:
the biasing circuit includes a control stage configured to determine an end of said start-up step and control opening of said first switch once said first terminal of said acoustic transducer reaches a desired biasing voltage; and
said control stage comprises a counter configured to determine a time interval such that said biasing voltage substantially corresponds to a steady-state value of said boosted voltage generated by said voltage-booster stage.

32. The device according to claim 31, wherein said filter includes a high-impedance resistor element set between said biasing terminal and said first terminal of said acoustic transducer; and wherein said first switch is connected in parallel to said high-impedance resistor element and is configured to short-circuit said high-impedance resistor element during said start-up step.

33. An electronic device, comprising:
an acoustic transducer;
a voltage-booster stage configured to provide a boosted voltage; and
a biasing circuit coupled to the acoustic transducer and configured to bias said acoustic transducer, the biasing circuit including:
a biasing terminal configured to receive the boosted voltage from the voltage-booster stage;
a filter coupled between the biasing terminal and the first terminal of said acoustic transducer, and configured to implement filtering of disturbances on said boosted voltage;
a first switch configured to provide a current path between said biasing terminal and the first terminal during a start-up step of said biasing circuit, and configured to allow the filter to filter the disturbances once said start-up step has terminated, wherein:
said filter includes a high-impedance resistor element set between said biasing terminal and said first terminal of said acoustic transducer; and wherein said first switch is connected in parallel to said high-impedance resistor element and is configured to short-circuit said high-impedance resistor element during said start-up step; and
said high-impedance resistor element includes a first diode element, and wherein said first switch includes a transistor configured to operate, in a first operating condition, as a second diode element, connected in anti-parallel configuration to said first diode element so as to define said high-impedance resistor element, and, in a second operating condition, as a low-impedance connection between said first terminal and said biasing terminal, short-circuiting said high-impedance resistor element.

34. The device according to claim 33, wherein the biasing circuit includes a driving stage configured to receive said boosted voltage and a timing signal, and to supply at an output of the driving stage a control signal to a control terminal of said first switch; said control signal having a high level, substantially coinciding with said boosted voltage, and a low level, lower than said boosted voltage by a voltage drop.

35. An electronic device, comprising:
an acoustic transducer;
a voltage-booster stage configured to provide a boosted voltage; and
a biasing circuit coupled to the acoustic transducer and configured to bias said acoustic transducer, the biasing circuit including:
a biasing terminal configured to receive the boosted voltage from the voltage-booster stage;
a filter coupled between the biasing terminal and the first terminal of said acoustic transducer, and configured to implement filtering of disturbances on said boosted voltage;
a first switch configured to provide a current path between said biasing terminal and the first terminal during a start-up step of said biasing circuit, and configured to allow the filter to filter the disturbances once said start-up step has terminated, wherein the biasing circuit includes a control stage configured to receive said boosted voltage and a timing signal, and to supply at an output of the control stage a control signal to a control terminal of said first switch; said control signal having a high level, substantially coinciding with said boosted voltage, and a low level, lower than said boosted voltage by a voltage drop.

36. The device according to 35, wherein said control stage has a circuit structure with substantially symmetrical first and second sides, the first side being coupled to the output of said control stage and including:
a current-mirror stage coupled to said output and configured to generate a biasing current; and
an output branch including a parallel circuit of an output transistor and a resistive network and configured to receive said boosted voltage; said current-mirror stage being configured to be alternately enabled and disabled by said timing signal, said resistive network being configured to generate said voltage drop with respect to said boosted voltage and said low level of said control signal in response to the biasing current being provided to the resistive network by the current-mirror stage when the current-mirror stage is enabled by the timing signal, and said output transistor being configured to bring said control signal at said output to said boosted voltage in response to the current-mirror stage being disabled by the timing signal.

37. An electronic device, comprising:
an acoustic transducer;

a voltage-booster stage configured to provide a boosted voltage; and a biasing circuit coupled to the acoustic transducer and configured to bias said acoustic transducer, the biasing circuit including:
   a biasing terminal configured to receive the boosted voltage from the voltage-booster stage;
   a filter coupled between the biasing terminal and the first terminal of said acoustic transducer, and configured to implement filtering of disturbances on said boosted voltage;
   a first switch configured to provide a current path between said biasing terminal and the first terminal during a start-up step of said biasing circuit, and configured to allow the filter to filter the disturbances once said start-up step has terminated
   a high-impedance resistor element;
   an amplifier having an input and configured to process an electrical output quantity of said acoustic transducer; and
   a second switch connected in parallel to said high-impedance resistor element and configured to short-circuit said high-impedance resistor element during said start-up step and couple said input of the amplifier to a reference-voltage line, wherein said high-impedance resistor element includes a first diode element; and wherein said second switch includes a transistor configured to operate, in a first operating condition, as a second diode element, connected in anti-parallel configuration to said first diode element so as to define said high-impedance resistor element, and, in a second operating condition, as a low-impedance connection between said input and said reference-voltage line, short-circuiting said high-impedance resistor element.

38. The device according to claim 37, wherein the acoustic transducer includes a second terminal coupled to a reference terminal and the biasing circuit includes:
   an output coupled to the first terminal of the acoustic transducer;
   an amplifier configured to process an electrical output quantity of said acoustic transducer; and
   a decoupling capacitor coupled between the output and the amplifier.

* * * * *